United States Patent [19]

Kanemura et al.

[11] Patent Number: 4,775,733

[45] Date of Patent: Oct. 4, 1988

[54] HIGH-REFRACTIVITY PLASTIC LENS RESIN FORMED BY REACTING AT LEAST ONE POLYISOCYANATE WITH AT LEAST ONE POLYTHIOL

[75] Inventors: Yoshinobu Kanemura, Kamakura; Masao Imai; Katsuyoshi Sasagawa, both of Yokohama; Nobuyuki Kajimoto; Teruyuki Nagata, both of Ohmuta, all of Japan

[73] Assignee: Mitsui Toatsu Chemicals, Incorporated, Tokyo, Japan

[21] Appl. No.: 19,622

[22] Filed: Feb. 27, 1987

[30] Foreign Application Priority Data

Mar. 1, 1986 [JP] Japan .................................. 57-42826
Apr. 7, 1986 [JP] Japan .................................. 57-78375

[51] Int. Cl.$^4$ ........................ C08G 18/32; C08G 18/70; C08G 18/34
[52] U.S. Cl. ........................ 528/67; 528/77; 528/79; 528/80; 528/81
[58] Field of Search ........................ 528/77, 79, 80, 81, 528/67

[56] References Cited

U.S. PATENT DOCUMENTS

| | | | |
|---|---|---|---|
| 4,094,843 | 12/1978 | McGinniss | 260/29.2 N |
| 4,342,863 | 8/1982 | Hohokabe et al. | 528/364 |
| 4,605,712 | 8/1986 | Mueller et al. | 528/24 |
| 4,689,387 | 8/1987 | Kajimoto et al. | 528/87 |

Primary Examiner—Harold D. Anderson
Assistant Examiner—Dennis R. Daley
Attorney, Agent, or Firm—Oblon, Fisher, Spivak, McClelland & Maier

[57] ABSTRACT

Disclosed herein are a high-refractivity plastic lens resin obtained by polymerizing under heat at least one polyisocyanate (I):

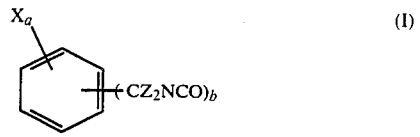

wherein X means a hydrogen, chlorine or bromine atom or a methyl or ethyl group, Z is a hydrogen atom or a methyl group, a stands for an integer of 1–4, b is an integer of 2–4, and a+b is not greater than 6 (a+b≦6), with at least one polythiol (II):

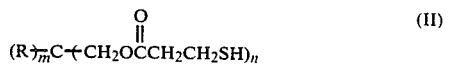

wherein R means a methyl, ethyl, chloromethyl or bromomethyl group, m stands for an integer of 0–2 and n is 4−m and/or at least one polythiol (III):

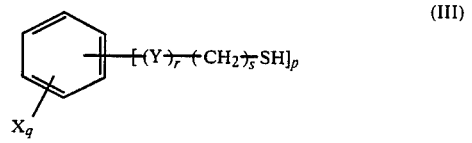

wherein X means a hydrogen, chlorine or bromine atom or a methyl or ethyl group, Y denotes an oxygen or sulfur atom, r stands for 0 or 1, s is an integer of 0–2, p is an integer of 2–4, q is an integer of 1–4 and p+q is not greater than 6 (p+q≦6), in such amounts that the —NCO/—SH molar ratio falls within 0.5–3.0, as well as a lens made of the above resin.

22 Claims, No Drawings

HIGH-REFRACTIVITY PLASTIC LENS RESIN FORMED BY REACTING AT LEAST ONE POLYISOCYANATE WITH AT LEAST ONE POLYTHIOL

BACKGROUND OF THE INVENTION (1) Field of the Invention

This invention relates to a plastic lens resin having a high refractive index (hereinafter may also be called "refractivity"), low dispersion, and either no or extremely little optical strain.

(2) Description of the Prior Art

Plastic lenses have been finding utility as eye lenses and camera lenses and in optical devices in recent years since they are lighter, less fragile and dyeable compared with inorganic lenses. As a resin employed widely for these applications these days, there is a resin obtained by subjecting diethylene glycol bisallylcarbonate (hereinafter called "CR-39") to radical polymerization. This resin has various merits such as excellent impact resistance, light weight, superb dyeability, and good machinability such as cutting, grinding and polishing machinability. Its refractive index is however small ($n_D = 1.50$) compared with inorganic lenses ($n_D = 1.52$). In order to achieve optical characteristics equivalent to glass lenses, it is essential to increase the central thickness, peripheral thickness and curvature of a lens, thereby unavoidably increasing the overall thickness of the lens. There is hence an outstanding demand for the development of a lens resin having a higher refractive index in order to overcome this inconvenience.

As lens resins which can purportedly materialize higher refractive indexes, there have been proposed urethane resins obtained respectively by a reaction between an isocyanate compound and a hydroxy compound such as diethylene glycol (Japanese Patent Laid-Open Nos. 136601/1982 and 136602/1982), a reaction between an isocyanate compound and a halogen-containing hydroxy compound such as tetrabromobisphenol A (Japanese Patent Laid-Open No. 164615/1983) and a reaction between an isocyanate compound and a sulfur-containing hydroxy compound (Japanese Patent Laid-Open Nos. 194401/1985 and 217229/1985); and S-alkyl thiocarbamate lens resins obtained individually by a reaction between an isocyanate compound and an aliphatic polythiol (Japanese Patent Laid-Open No. 199016/1985).

The S-alkyl thiocarbamate lens resins involve a few problems. They have large polymerization velocities even at relatively low temperatures and substantial difficulties are encountered in controlling the heat during their polymerization. Further, the resulting lenses have great optical strain. It is hence difficult to provide useful lenses.

SUMMARY OF THE INVENTION

With the foregoing in view, the present inventors have conducted an investigation with respect to a variety of polythiols. As a result, it has been found that a resin, which is obtained by reacting at least one polyisocyanate represented by the below-described general formula (I) with at least one polythiol represented by the below-described general formula (II) and/or at least one polythiol represented by the below-described general formula (III), features milder progress of its polymerization reaction and hence easier polymerization and moreover develops either no or extremely little optical strain subsequent to its polymerization compared with the S-alkyl thiocarbamate lens resins while retaining comparable light weight property, high refractive index, low dispersion, excellent transparency, impact resistance, weatherability and machinability, leading to completion of this invention.

In one aspect of this invention, there is thus provided a high-refractivity plastic lens resin obtained by polymerizing under heat at least one polyisocyanate represented by the following general formula (I):

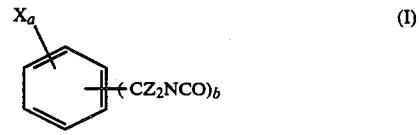

wherein X means a hydrogen, chlorine or bromine atom or a methyl or ethyl group, Z is a hydrogen atom or a methyl group, a stands for an integer of 1–4, b is an integer of 2–4, and a+b is not greater than 6 ($a+b \leq 6$), with at least one polythiol represented by the following general formula (II):

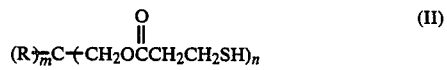

wherein R means a methyl, ethyl, chloromethyl or bromomethyl group, m stands for an integer of 0–2, n is 4–m and/or at least one polythiol represented by the following general formula (III):

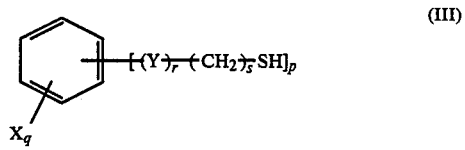

wherein X means a hydrogen, chlorine or bromine atom or a methyl or ethyl group, Y denotes an oxygen or sulfur atom, r stands for 0 or 1, s is an integer of 0–2, p is an integer of 2–4, q is an integer of 1–4 and p+q is not greater than 6 ($p+q \leq 6$), in such amounts that the —NCO/—SH molar ratio falls within 0.5–3.0.

DETAILED DESCRIPTION OF THE INVENTION AND PREFERRED EMBODIMENTS

Illustrative specific examples of the compound which is represented by the general formula (I) and is useful in the practice of this invention may include compound such as o-xylylene diisocyanate, m-xylylene diisocyanate, p-xylylene diisocyanate, 1,3-bis(α,α-dimethylisocyanatemethyl)benzene, 1,4-bis(α,α-dimethylisocyanatemethyl)benzene and mesitylene triisocyanate as well as their nucleus-chlorinated, brominated, methylated and ethylated derivatives. The derivatives may specifically include 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate, etc. As illustrative specific examples of the compound represented by the general formula (II), may be mentioned pentaerythritol tetrakis(mercaptopropionate), trimethylolpropane tris(mercaptopropionate), trimethylolethane tris(mercaptopropionate), dichloroneopentylglycol bis(mercaptopropionate) and dibromoneopentylglycol bis(mercaptopropionate).

On the other hand, illustrative specific examples of the compound represented by the general formula (III) may include:

1,2-dimercaptobenzene;
1,3-dimercaptobenzene;
1,4-dimercaptobenzene;
1,2-bis(mercaptomethylene)benzene;
1,3-bis(mercaptomethylene)benzene;
1,4-bis(mercaptomethylene)benzene;
1,2-bis(mercaptoethylene)benzene;
1,3-bis(mercaptoethylene)benzene;
1,4-bis(mercaptoethylene)benzene;
1,2-bis(mercaptomethylenoxy)benzene;
1,3-bis(mercaptomethylenoxy)benzene;
1,4-bis(mercaptomethylenoxy)benzene;
1,2-bis(mercaptoethylenoxy)benzene;
1,3-bis(mercaptoethylenoxy)benzene;
1,4-bis(mercaptoethylenoxy)benzene;
1,2-bis(mercaptomethylenethio)benzene;
1,3-bis(mercaptomethylenethio)benzene,
1,4-bis(mercaptomethylenethio)benzene;
1,2-bis(mercaptoethylenethio)benzene;
1,3-bis(mercaptoethylenethio)benzene;
1,4-bis(mercaptoethylenethio)benzene;
1,2,3-trimercaptobenzene;
1,2,4-trimercaptobenzene;
1,3,5-trimercaptobenzene;
1,2,3-tris(mercaptomethylene)benzene;
1,2,4-tris(mercaptomethylene)benzene;
1,3,5-tris(mercaptomethylene)benzene;
1,2,3-tris(mercaptoethylene)benzene;
1,2,4-tris(mercaptoethylene)benzene;
1,3,5-tris(mercaptoethylene)benzene;
1,2,3-tris(mercaptomethylenoxy)benzene;
1,2,4-tris(mercaptomethylenoxy)benzene;
1,3,5-tris(mercaptomethylenoxy)benzene;
1,2,3-tris(mercaptoethylenoxy)benzene;
1,2,4-tris(mercaptoethylenoxy)benzene;
1,3,5-tris(mercaptoethylenoxy)benzene;
1,2,3-tris(mercaptomethylenethio)benzene;
1,2,4-tris(mercaptomethylenethio)benzene;
1,3,5-tris(mercaptomethylenethio)benzene;
1,2,3-tris(mercaptoethylenethio)benzene;
1,2,4-tris(mercaptoethylenethio)benzene;
1,3,5-tris(mercaptoethylenethio)benzene;
1,2,3,4-tetramercaptobenzene;
1,2,3,5-tetramercaptobenzene;
1,2,4,5-tetramercaptobenzene;
1,2,3,4-tetrakis(mercaptomethylene)benzene;
1,2,3,5-tetrakis(mercaptomethylene)benzene;
1,2,4,5-tetrakis(mercaptomethylene)benzene;
1,2,3,4-tetrakis(mercaptoethylene)benzene;
1,2,3,5-tetrakis(mercaptoethylene)benzene;
1,2,4,5-tetrakis(mercaptoethylene)benzene;
1,2,3,4-tetrakis(mercaptomethylenoxy)benzene;
1,2,3,5-tetrakis(mercaptomethylenoxy)benzene;
1,2,4,5-tetrakis(mercaptomethylenoxy)benzene;
1,2,3,4-tetrakis(mercaptoethylenoxy)benzene;
1,2,3,5-tetrakis(mercaptoethylenoxy)benzene;
1,2,4,5-tetrakis(mercaptoethylenoxy)benzene;
1,2,3,4-tetrakis(mercaptomethylenethio)benzene;
1,2,3,5-tetrakis(mercaptomethylenethio)benzene;
1,2,4,5-tetrakis(mercaptomethylenethio)benzene;
1,2,3,4-tetrakis(mercaptoethylenethio)benzene;
1,2,3,5-tetrakis(mercaptoethylenethio)benzene;
1,2,4,5-tetrakis(mercaptoethylenethio)benzene.

The nucleus-chlorinated, brominated, methylated and ethylated derivatives of the above exemplified specific compounds may also be mentioned as exemplary compound (III). As specific examples of such derivatives, may be mentioned 3-chloro-1,2-dimercaptobenzene, 4-chloro-1,2-dimercaptobenzene, 3,5-dichloro-1,2-dimercaptobenzene, 3,4,5-tribromo-1,2-dimercaptobenzene, 5-methyl-1,3-dimercaptobenzene, 5-ethyl-1,3-dimercaptobenzene, 2,3,4,6-tetrachloro-1,5-bis-(mercaptomethylene)benzene, etc.

At least one polyisocyanate represented by the general formula (I) is reacted with at least one polythiol represented by the general formula (II) and/or at least one polythiol represented by the general formula (III) in such amounts that the —NCO/—SH ratio falls within a range of 0.5–3.0, preferably, within a range of 0.5–1.5. In order to improve various properties, especially, the heat resistance, less than 20 mole % of the polyisocyanate represented by the general formula (I) may be replaced by an aromatic isocyanate such as a tolyene diisocyanate or diphenylmethane diisocyanate in the present invention. Furthermore, less than 20 mole % of the polythiol represented by the general formula (II) may also be replaced by another thiol represented by the following general formula (IV):

$$(R)_{\overline{m}}C(CH_2OCCH_2SH)_n \qquad (IV)$$

wherein R, m and n have the same meaning as defined above, or by a polyol such as trimethylol propane or trimethylol ethane. If the proportion of the replacement compound, namely, the aromatic isocyanate, the polythiol represented by the general formula (IV) or the polyol such as trimethylol propane exceeds 20 mole %, the optical strain is increased and the control of the heat during the polymerization is rendered more complex. It is hence not preferable to use the replacement compound in such an excess proportion.

In the present invention, it is also possible to incorporate, for improved weatherability, additives such as ultraviolet ray absorbent, oxidation inhibitor, coloring inhibitor and fluorescent dye as needed. The resin of this invention can be dyed readily with an ordinary dispersible dye in water or a solvent. In order to facilitate its dyeing, it is also feasible to add a carrier or to heat the water or solvent.

For the production of the lens resin of this invention, at least one polyisocyanate represented by the general formula (I) is added with at least one polythiol represented by the general formula (II) and/or at least one polythiol represented by the general formula (III). The above-mentioned aromatic polyisocyanate, polyol or polythiol and additives may also be added in accordance with physical properties required. The resultant mixture is then processed by a known cast-molding technique, namely, is poured in a mold formed in combination of a metal mold and a resin gasket, followed by its heating and curing. Here, a mold release agent may be applied to the mold or may be incorporated in the mixture so as to facilitate the release of the resulting resin after the molding. The reaction time and temperature vary depending on the types of monomers to be used. However, they are generally −20°–150° C. and 0.5 hr.–72 hrs. respectively.

The thus-obtained lens resin of this invention is colorless and transparent and has a high refractive index, low dispersion and low specific gravity. It is excellent in impact resistance and weatherability. Moreover, its polymerization is easy. It is free of optical strain, and is excellent in machinability such as lens polishing machinability and also in dyeability. It is hence suitable for use as eyeglass lenses and camera lenses and in other optical devices.

The present invention will be described in more detail by the following Examples. The refractive index, Abbe number, lens polishing machinability, impact resistance and yellowing resistance upon exposure to ultra violet rays of a lens resin obtained in each of the following Examples were measured or determined respectively in accordance with the following testing methods.

Refractive index and Abbe number:

Measured at 20° C. by means of a Pulfrich refractometer.

Machinability:

The resin was ground and polished by a lens polisher for eyeglass lenses. The machinability is rated good where the thus-polished surface was good, whereas the machinability is rated fair (Δ) where the thus-polished surface was fair.

Impact resistance:

Using a flat plate having a central thickness of 2 mm, a falling ball impact test was conducted in accordance with the FDA standards. The impact resistance is rated good ○ where the flat plat did not shatter.

Ultraviolet light resistance:

A lens was mounted on a weather-o-meter equipped with sunshine carbon arc lamps. Upon an elapsed time of 200 hours, the lens was removed from the weather-o-meter and its hue was compared with the hue of a lens before the test on the weather-o-meter. The following ranking standard was followed.

No change ... ○
Slight yellowing ... Δ
Substantial yellowing ... X

Optical strain:

Determined visually by means of an optical strain meter. The following ranking standard was followed.
No optical strain ... ○
Noticeable optical strain ... X

EXAMPLE 1

Uniformly mixed at room temperature were 9.4 g (0.050 mole) of m-xylylene diisocyanate and 7.1 g (0.050 mole) of 1,2-dimercaptobenzene. The resultant mixture was poured into a mold, which was formed of a glass mold treated with a mold release agent of the baking silicone type and a TEFLON (trade mark) gasket. The mixture was heated at 45° C. for 3 hours, at 60° C. for 2 hours and then at 80° C. for 2 hours. The thus-obtained lens had a refractive index of 1.66, an Abbe numer of 28 and a specific gravity of 1.32. It was colorless and transparent, excellent in machinability, impact resistance and ultraviolet light resistance, and free of optical strain.

EXAMPLES 2–23

Following the procedure of Example 1, lenses were produced separately from the compositions given in Tables 1 and 2. Test results are also shown in the same tables.

COMPARATIVE EXAMPLE 1

An attempt was made to mix 9.4 g (0.050 mole) of m-xylylene diisocyanate with 10.8 g (0.025 mole) of pentaerythritol tetrakis(thioglycolate) while cooling them at −10° C. It was however unable to mix them due to unduly high viscosity. When the temperature was hence raised approximately to room temperature, they underwent polymerization with violet generation of heat. The refractive index and Abbe number of the resultant lens were 1.60 and 34 respectively but substantial optical strain was contained.

COMPARATIVE EXAMPLES 2–4

Following the procedure of Comparative Example 1, lenses were produced separately from the compositions given in Tables 1 and 2. Test results are also shown in the same tables.

TABLE 1

| Ex. | Polyisocyanate (mole) | Polythiol (mole) | Additive (mole) | Refractive index, $n_D^{20}$ | Abbe number | Specific gravity | Machinability |
| --- | --- | --- | --- | --- | --- | --- | --- |
| 2 | m-XDI[1] (0.050) | 1,2,3-trimercaptobenzene (0.033) | — | 1.67 | 28 | 1.31 | ○ |
| 3 | m-XDI (0.035) p-XDI[2] (0.015) | 4-methyl-1,2-dimercaptobenzene (0.050) | — | 1.65 | 30 | 1.32 | ○ |
| 4 | m-XDI (0.050) | 3,6-dichloro-1,2-dimercaptobenzene (0.040) | — | 1.66 | 29 | 1.34 | ○ |
| 5 | m-XDI (0.050) | 3,4,6-trichloro-1,2-dimercaptobenzene (0.040) | TMP[3] (0.007) | 1.65 | 29 | 1.36 | ○ |
| 6 | m-XDI (0.050) | 1,4-bis(mercaptomethylene)benzene (0.030), PEMP[4] (0.010) | — | 1.63 | 31 | 1.31 | ○ |
| 7 | m-XDI (0.050) | 1,3-bis(mercaptomethylene)benzene (0.040) | PETG[5] (0.005) UV absorbent [1]* | 1.65 | 30 | 1.31 | ○ |
| 8 | m-XDI (0.050) | 2,4,5,6-tetrachloro-1,3-bis(mercaptomethylene)benzene (0.050) | — | 1.67 | 29 | 1.38 | ○ |
| 9 | m-XDI (0.050) | 1,2-bis(mercaptoethylene)benzene (0.040), PEMP (0.01) | — | 1.62 | 34 | 1.31 | ○ |
| 10 | m-XDI (0.050) | 1,3-bis(mercaptomethylenoxy)benzene (0.030) | TMP (0.013) | 1.64 | 32 | 1.30 | ○ |
| 11 | m-XDI (0.050) | 1,3-bis(mercaptomethylenethio)benzene (0.050) | — | 1.66 | 30 | 1.32 | ○ |
| 12 | TC-m-XDI[6] | 1,2-dimercaptobenzene | PETG | 1.66 | 31 | 1.39 | ○ |

TABLE 1-continued

| | Polyisocyanate (mole) | Polythiol (mole) | Additive (mole) | Refractive index, $n_D^{20}$ | Abbe number | Specific gravity | Machinability |
|---|---|---|---|---|---|---|---|
| 13 | (0.050) 4-methyl-m-XDI[7] (0.050) | (0.040) 1,2-dimercaptobenzene (0.040) | (0.01) PETG (0.01) | 1.63 | 33 | 1.32 | O |
| 14 | m-XDI (0.050) | PEMP (0.025) | — | 1.59 | 36 | 1.31 | O |
| 15 | m-XDI (0.045), tolyene diisocyanate (0.005) | PEMP (0.025) | — | 1.60 | 35 | 1.31 | O |
| 16 | TC-m-XDI (0.050) | PEMP (0.030) | — | 1.61 | 34 | 1.34 | O |
| 17 | m-XDI (0.050) | TMPMP[8] (0.033) | — | 1.59 | 35 | 1.30 | O |
| 18 | m-XDI (0.050) | TMEMP[9] (0.033) | — | 1.59 | 35 | 1.29 | O |
| 19 | 4-methyl-m-XDI (0.050) | PEMP (0.025) | — | 1.59 | 36 | 1.32 | O |
| 20 | m-XDI (0.050) | DCNPMP[10] (0.050) | — | 1.60 | 39 | 1.37 | O |
| 21 | m-XDI (0.050) | BCNPMP[11] (0.050) | — | 1.61 | 40 | 1.41 | O |
| 22 | 1,3-bis(α,α-dimethyl-isocyanatemethyl)-benzene (0.050) | PEMP (0.025) | — | 1.57 | 39 | 1.32 | O |
| 23 | 1,3-bis(α,α-dimethyl-isocyanatemethyl)-benzene (0.050) | 1,3-bis(mercaptomethylene)benzene (0.035), PEMP (0.008) | — | 1.60 | 36 | 1.32 | O |
| Comp. Ex. | | | | | | | |
| 1 | m-XDI (0.050) | PETG (0.025) | — | 1.60 | 34 | 1.44 | O |
| 2 | m-XDI (0.025), tolylene diisocyanate (0.025) | PETG (0.025) | — | 1.61 | 29 | 1.43 | O |
| 3 | m-XDI (0.050) | TMTG[12] (0.033) | — | 1.60 | 34 | 1.33 | O |
| 4 | m-XDI (0.050) | di(2-mercaptoethyl) ether (0.050) | — | 1.62 | 33 | 1.34 | O |

*wt. % based on the sum of the weights of the polyisocyanate and polythiol used.

TABLE 2

| | Polyisocyanate (mole) | Polythiol (mole) | Additive (mole) | Impact resistance | UV light resistance | Appearance | Optical strain |
|---|---|---|---|---|---|---|---|
| Ex. | | | | | | | |
| 2 | m-XDI[1] (0.050) | 1,2,3-trimercaptobenzene (0.033) | — | O | O | colorless transparent | O |
| 3 | m-XDI (0.035) p-XDI[2] (0.015) | 4-methyl-1,2-dimercaptobenzene (0.050) | — | O | O | colorless transparent | O |
| 4 | m-XDI (0.050) | 3,6-dichloro-1,2-dimercaptobenzene (0.040) | — | O | O | colorless transparent | O |
| 5 | m-XDI (0.050) | 3,4,6-trichloro-1,2-dimercaptobenzene (0.040) | TMP[3] (0.007) | O | O | colorless transparent | O |
| 6 | m-XDI (0.050) | 1,4-bis(mercaptomethylene)-benzene (0.030), PEMP[4] (0.010) | — | O | O | colorless transparent | O |
| 7 | m-XDI (0.050) | 1,3-bis(mercaptomethylene)-benzene (0.040) | PETG[5] (0.005) UV absorbent [1]* | O | O | colorless transparent | O |
| 8 | m-XDI (0.050) | 2,4,5,6-tetrachloro-1,3-bis(mercaptomethylene)-benzene (0.050) | — | O | O | colorless transparent | O |
| 9 | m-XDI (0.050) | 1,2-bis(mercaptoethylene)-benzene (0.040), PEMP (0.01) | — | O | O | colorless transparent | O |
| 10 | m-XDI (0.050) | 1,3-bis(mercaptomethylenoxy)benzene (0.030) | TMP (0.013) | O | O | colorless transparent | O |
| 11 | m-XDI (0.050) | 1,3-bis(mercaptomethylenethio)benzene (0.050) | — | O | O | colorless transparent | O |
| 12 | TC-m-XDI[6] (0.050) | 1,2-dimercaptobenzene (0.040) | PETG (0.01) | O | O | colorless transparent | O |
| 13 | 4-methyl-m-XDI[7] (0.050) | 1,2-dimercaptobenzene (0.040) | PETG (0.01) | O | O | colorless transparent | O |
| 14 | m-XDI (0.050) | PEMP (0.025) | — | O | O | colorless transparent | O |
| 15 | m-XDI (0.045), tolyene diisocyanate (0.005) | PEMP (0.025) | — | O | O | colorless transparent | O |
| 16 | TC-m-XDI (0.050) | PEMP (0.030) | — | O | O | colorless transparent | O |
| 17 | m-XDI (0.050) | TMPMP[8] (0.033) | — | O | O | colorless transparent | O |
| 18 | m-XDI (0.050) | TMEMP[9] (0.033) | — | O | O | colorless transparent | O |
| 19 | 4-methyl-m-XDI | PEMP (0.025) | — | O | O | colorless | O |

TABLE 2-continued

| | Polyisocyanate (mole) | Polythiol (mole) | Additive (mole) | Impact resistance | UV light resistance | Appearance | Optical strain |
|---|---|---|---|---|---|---|---|
| 20 | m-XDI (0.050) | DCNPMP[10] (0.050) | — | ○ | ○ | transparent colorless | ○ |
| 21 | m-XDI (0.050) | BCNPMP[11] (0.050) | — | ○ | ○ | transparent colorless | ○ |
| 22 | 1,3-bis(α,α-dimethyl-isocyanatemethyl)-benzene (0.050) | PEMP (0.025) | — | ○ | ○ | transparent colorless transparent | ○ |
| 23 | 1,3-bis(α,α-dimethyl-isocyanatemethyl)-benzene (0.050) | 1,3-bis(mercaptomethyl-ene)benzene (0.035), PEMP (0.008) | — | ○ | ○ | colorless transparent | ○ |
| Comp. Ex. | | | | | | | |
| 1 | m-XDI (0.050) | PETG (0.025) | — | ○ | ○ | colorless transparent | X |
| 2 | m-XDI (0.025), tolylene diisocyanate (0.025) | PETG (0.025) | — | ○ | X | colorless transparent | X |
| 3 | m-XDI (0.050) | TMTG[12] (0.033) | — | ○ | ○ | colorless transparent | X |
| 4 | m-XDI (0.050) | di(2-mercaptoethyl) ether (0.050) | — | ○ | ○ | colorless transparent | X |

Note:
*wt. % based on the sum of the weights of the polyisocyanate and polythiol used.
[1]m-Xylylene diisocyanate.
[2]p-Xylylene diisocyanate.
[3]Trimethylol propane.
[4]Pentaerythritol tetrakis(mercaptopropionate).
[5]Pentaerythritol tetrakis(thioglycolate).
[6]Tetrachloro-m-xylylene diisocyanate.
[7]4-Methyl-m-xylylene diisocyanate.
[8]Trimethylolpropane tris(mercaptopropionate).
[9]Trimethylolethane tris(mercaptopropionate).
[10]Dichloroneopentylglycol bis(mercaptopropionate).
[11]Dibromoneopentylglycol bis(mercaptopropionate).
[12]Trimethylolpropane tris(thioglycolate).

What is claimed is:

1. A high-refractivity plastic lens resin consisting essentially of a polymeric reaction product obtained by copolymerizing under heat at least one polyisocyanate component with at least one polythiol component:
wherein said polyisocyanate component is (1) a polyisocyanate of formula (I) or (2) a combination of at least 80 mol% of a polyisocyanate of formula (I) and up to 20 mol% of an aromatic isocyanate, wherein said formula (I) is

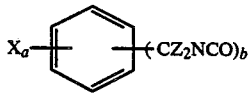

and;
wherein said polythiol component is (1) at least one polythiol of formula (II), (2) at least one polythiol of formula (III), or (3) a combination of at least 80 mol% of a polythiol of formula (II) in combination with up to 20 mol% of a polythiol of formula (IV), wherein said formulase (II), (III) and (IV) are

 (II)

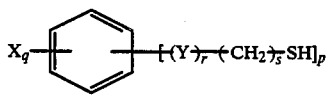 (III)

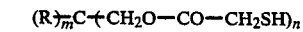 (IV)

wherein:

X is a hydrogen atom, a chlorine atom, a bromine atom, a methyl group, or an ethyl group;
Z is a hydrogen atom, or a methyl group;
a is an integer of 1 to 4, b is an integer of from 2 to 4, and the sum of a and b is not greater than 6;
R is a methyl group, an ethyl group, a chloromethyl group, or a bromomethyl group;
m is an integer of from 0 to 2;
n is 4-m;
Y is an oxygen atom or a sulfur atom;
r is 0 or 1;
s is an integer of from 0 to 2;
p is an integer of from 2 to 4, q is an integer of from 1 to 4, and the sum of p and q is not greater than 6;
wherein said polyisocyanate component and said polythiol component are used in such an amount that the —NCO/—SH molar ratio falls within the range of from 0.5 to 3.0.

2. A high-refractivity plastic lens resin consisting essentially of a polymeric reaction product obtained by polymerizing under heat at least one polyisocyanate of formula (I)

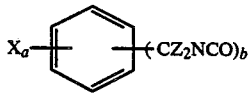 (I)

with at least one polythiol of formula (II) or (III);

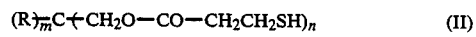 (II)

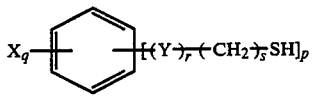
(III)

wherein:
X is a hydrogen atom, a chlorine atom, a bromine atom, a methyl group, or an ethyl group;
Z is a hydrogen atom, or a methyl group;
a is an integer of from 1 to 4, b is an integer of from 2 to 4, and the sum of a and b is not greater than 6;
R is a methyl group, an ethyl group, a chloromethyl group, or a bromomethyl group;
m is an integer of from 0 to 2;
n is 4-m;
Y is an oxygen atom or a sulfur atom;
r is 0 or 1;
s is an integer of from 0 to 2;
p is an integer of from 2 to 4, q is an integer of from 1 to 4, and the sum of p and q is not greater than 6;
wherein said polyisocyanate and said polythiol are copolymerized in such an amount that the —NCO/—SH molar ratio falls within the range of from 0.5 to 3.0.

3. The high-refractivity plastic lens resin of claim 2, wherein said polyisocyanate of formula (I) is tolylene diisocyanate.

4. The high-refractivity plastic lens resin of claim 1, wherein said aromatic isocyanate is diphenylmethane diisocyanate.

5. The high-refractivity plastic lens resin of claim 1, wherein said polythiol component is up to 20 mol% of said polythiol of formula (IV) and at least 80 mol% of said polythiol of formula (II).

6. The high-refractivity plastic lens resin of claim 1, wherein said polyisocyanate of formula (I) is at least one member selected from the group consisting of o-xylylene diisocyanate, m-xylylene diisocyanate, p-xylylene diisocyanate; 1,3-bis(α,α-dimethylisocyanatemethyl)benzene, 1,4-bis(α,α-dimethylisocyanatemethyl)benzene, mesitylene triisocyanate and their respective nucleus-chlorinated, brominated, methylated and ethylated derivatives.

7. The high-refractivity plastic lens resin of claim 1, wherein said polyisocyanate of formula (I) is 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate or 4-ethyl-m-xylylene diisocyanate.

8. The high-refractivity plastic lens resin of claim 1, wherein said polythiol of formula (II) is at least one member selected from the group consisting of pentaerythritol tetrakis(mercaptopropionate), trimethylolpropane tris(mercaptopropionate), trimethylolethane tris(mercaptopropionate), dichloroneopentylglycol bis(mercaptopropionate) and dibromoneopentylglycol bis(mercaptopropionate).

9. The high-refractivity plastic lens resin of claim 8, wherein said polythiol of formula (III) is at least one member selected from the group consisting of 1,2-dimercaptobenzene; 1,3-dimercaptobenzene; 1,4-dimercaptobenzene; 1,2-bis(mercaptomethylene)benzene; 1,3-bis(mercaptomethylene)benzene; 1,4-bis(mercaptomethylene)benzene; 1,2-bis(mercaptoethylene)benzene; 1,3-bis(mercaptoethylene)benzene; 1,4-bis(mercaptoethylene)benzene; 1,2-bis(mercaptomethylenoxy)benzene; 1,3-bis(mercaptomethylenoxy)benzene; 1,4-bis(mercaptomethylenoxy)benzene; 1,2-bis(mercaptoethylenoxy)benzene; 1,3-bis(mercaptoethylenoxy)benzene; 1,4-bis(mercaptoethylenoxy)benzene; 1,2-bis(mercaptomethylenethio)benzene; 1,3-bis(mercaptomethylene-hio)benzene; 1,4-bis(mercaptomethylenethio)benzene; 1,2-bis(mercaptoethylenethio)benzene; 1,3-bis(mercaptoethylenethio)benzene; 1,4-bis(mercaptoethylenethio)benzene; 1,2,3-trimercaptobenzene; 1,2,4-trimercaptobenzene; 1,3,5-trimercaptobenzene; 1,2,3-tris(mercaptomethylene)benzene; 1,2,4-tris(mercaptomethylene)benzene; 1,3,5-tris(mercaptomethylene)benzene; 1,2,3-tris(mercaptoethylene)benzene; 1,2,4-tris(mercaptoethylene)benzene; 1,3,5-tris(mercaptoethylene)benzene; 1,2,3-tris(mercaptomethylenoxy)benzene; 1,2,4-tris(mercaptomethylenoxy)benzene; 1,3,5-tris(mercaptomethylenoxy)benzene; 1,2,3-tris(mercaptoethylenoxy)benzene; 1,2,4-tris(mercaptoethylenoxy)benzene; 1,3,5-tris(mercaptoethylenoxy)benzene; 1,2,3-tris(mercaptomethylenethio)benzene; 1,2,4-tris(mercaptomethylenethio)benzene; 1,3,5-tris(mercaptomethylenethio)benzene; 1,2,3-tris(mercaptoethylenethio)benzene; 1,2,4-tris(mercaptoethylenethio)benzene; 1,3,5-tris(mercaptoethylenethio)benzene; 1,2,3,4-tetramercaptobenzene; 1,2,3,5-tetramercaptobenzene; 1,2,4,5-tetramercaptobenzene; 1,2,3,4-tetrakis(mercaptomethylene)benzene; 1,2,3,5-tetrakis(mercaptomethylene)benzene; 1,2,4,5-tetrakis(mercaptomethylene)benzene; 1,2,3,4-tetrakis(mercaptoethylene)benzene; 1,2,3,5-tetrakis(mercaptoethylene)benzene; 1,2,4,5-tetrakis(mercaptoethylene)benzene; 1,2,3,4-tetrakis(mercaptomethylenoxy)benzene; 1,2,3,5-tetrakis(mercaptomethylenoxy)benzene; 1,2,4,5-tetrakis(mercaptomethylenoxy)benzene; 1,2,3,4-tetrakis(mercaptoethylenoxy)benzene; 1,2,3,5-tetrakis(mercaptoethylenoxy)benzene; 1,2,4,5-tetrakis(mercaptoethylenoxy)benzene; 1,2,3,4-tetrakis(mercaptomethylenethio)benzene; 1,2,3,5-tetrakis(mercaptomethylenethio)benzene; 1,2,4,5-tetrakis(mercaptomethylenethio)benzene; 1,2,3,4-tetrakis(mercaptoethylenethio)benzene; 1,2,3,5-tetrakis(mercaptoethylenethio)benzene; 1,2,4,5-tetrakis(mercaptoethylenethio)benzene; and the respective nucleus-chlorinated, brominated, methylated and ethylated derivatives.

10. The high-refractivity plastic lens resin of claim 1, wherein said polyisocyanate of formula (III) is at least one member selected from the group consisting of 3-chloro-1,2-dimercaptobenzene, 4-chloro-1,2-dimercaptobenzene, 3,5-dichloro-1,2-dimercaptobenzene, 3,4,5-tribromo-1,2-dimercaptobenzene, 5-methyl-1,3-dimercaptobenzene, 5-ethyl-1,3-dimercaptobenzene, and 2,3,4,6-tetrachloro-1,5-bis-(mercaptomethylene)benzene.

11. The high-refractivity plastic lens resin of claim 1, wherein said polyisocyanate component and said polythiol component are copolymerized in such an amount that the —NCO/—SH molar ratio falls within the range of 0.5 to 1.5.

12. A lens consisting essentially of a copolymer obtained by copolymerizing under heat at least one polyisocyanate component and one polythiol component,
wherein said polyisocyanate component is (1) a polyisocyanate of formula (I) or (2) at least 80 mol% of a polyisocyanate of formula (I) and up to 20 mol% of aromatic isocyanate, wherein said formula (I) is $$X_a\text{—}\underset{\text{(benzene)}}{\bigcirc}\text{—(CZ}_2\text{NCO)}_b \quad \text{(I)}$$

and;
wherein said polythiol component is (1) at least one polythiol of formula (II) (2) at least one polythiol of formula (III), or (3) a combination of at least 80 mol% of a polythiol of formula (II) and up to 20 mol% of a polythiol of formula (IV), wherein said formulae (II), (III) and (IV)

$$(R)_{\overline{m}}C\text{-(CH}_2\text{O—CO—CH}_2\text{CH}_2\text{SH)}_n \quad \text{(II)}$$

$$X_q\text{—}\underset{\text{(benzene)}}{\bigcirc}\text{—[(Y)}_{\overline{r}}\text{(CH}_2\text{)}_{\overline{s}}\text{SH]}_p \quad \text{(III)}$$

$$(R)_{\overline{m}}C\text{-(CH}_2\text{O—CO—CH}_2\text{SH)}_n \quad \text{(IV)}$$

wherein:
X is a hydrogen atom, a chlorine atom, a bromine atom, a methyl group, or an ethyl group;
Z is a hydrogen atom, or a methyl group;
a is an integer of 1 to 4, b is an integer of from 2 to 4, and the sum of a and b is not greater than 6;
R is a methyl group, an ethyl group, a chloromethyl group, or a bromomethyl group;
m is an integer of from 0 to 2;
n is 4-m;
Y is an oxygen atom or a sulfur atom;
r is 0 or 1;
s is an integer of from 0 to 2;
p is an integer of from 2 to 4, q is an integer of from 1 to 4, and the sum of p and q is not greater than 6;
wherein said polyisocyanate component and said polythiol component are copolymerized in such an amount that the —NCO/—SH molar ratio falls within the range of 0.5 to 3.0.

13. A lens consisting essentially of a copolymer obtained by copolymerizing under heat at least one polyisocyanate of formula (I)

$$X_a\text{—}\underset{\text{(benzene)}}{\bigcirc}\text{—(CZ}_2\text{NCO)}_b \quad \text{(I)}$$

with at least one polythiol of formula (II) or (III):

$$(R)_{\overline{m}}C\text{-(CH}_2\text{O—CO—CH}_2\text{CH}_2\text{SH)}_n \quad \text{(II)}$$

$$X_q\text{—}\underset{\text{(benzene)}}{\bigcirc}\text{—[(Y)}_{\overline{r}}\text{(CH}_2\text{)}_{\overline{s}}\text{SH]}_p \quad \text{(III)}$$

wherein:
X is a hydrogen atom, a chlorine atom, a bromine atom, a methyl group, or an ethyl group;
Z is a hydrogen atom, or a methyl group;
a is an integer of 1 to 4, b is an integer of from 2 to 4, and the sum of a and b is not greater than 6;
R is a methyl group, an ethyl group, a chloromethyl group, or a bromomethyl group;
m is an integer of from 0 to 2;
n is 4-m;
Y is an oxygen atom or a sulfur atom;
r is 0 or 1;
s is an integer of from 0 to 2;
p is an integer of from 2 to 4, q is an integer of from 1 to 4, and the sum of p and q is not greater than 6;
wherein said polyisocyanate component and said polythiol component are copolymerized in such an amount that the —NCO/—SH molar ratio falls within the range of 0.5 to 3.0.

14. The lens of claim 12, wherein said aromatic isocyanate is tolylene diisocyanate.

15. The lens of claim 12, wherein said aromatic isocyanate is diphenylmethane diisocyanate.

16. The lens of claim 12, wherein said polythiol component is at least 80 mol% of said polythiol of formula (II) and up to 20 mol% of said polythiol of formula (IV).

17. The lens of claim 12, wherein said polyisocyanate of formula (I) is at least one member selected from the group consisting of o-xylylene diisocyanate, m-xylylene diisocyanate, p-xylylene diisocyanate, 1,3-bis(α,α-dimethylisocyanatemethyl)benzene, 1,4-bis(α,α-dimethylisocyanatemethyl)benzene, mesitylene triisocyanate and their respective nucleus-chlorinated, brominated, methylated and ethylated derivatives.

18. The lens of claim 12, wherein said polyisocyanate of formula (I) is at least one member selected from the group consisting of 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate and 4-ethyl-m-xylylene diisocyanate.

19. The lens of claim 12, wherein said polythiol of formula (II) is at least one member selected from the group consisting of pentaerythritol tetrakis(mercaptopropionate), trimethylolpropane tris(mercaptopropionate), trimethylolethane tris(mercaptopropionate), dichloroneopentylglycol bis(mercaptopropionate) and dibromoneopentylglycol bis(mercaptopropionate).

20. The lens of claim 12, wherein said polythiol of formula (III) is at least one member selected from the group consisting of 1,2-dimercaptobenzene; 1,3-dimercaptobenzene; 1,4-dimercaptobenzene; 1,2-bis(mercaptomethylene)benzene; 1,3-bis(mercaptomethylene)benzene; 1,4-bis(mercaptomethylene)benzene; 1,2-bis(mercaptoethylene)benzene; 1,3-bis(mercapoethylene)benzene; 1,4-bis(mercaptoethylene)benzene; 1,2-bis(mercaptomethylenoxy)benzene; 1,3-bis(mercaptomethylenoxy)benzene; 1,4-bis(mercaptomethylenoxy)benzene; 1,2-bis(mercaptoethylenoxy)benzene; 1,3-bis(mercaptoethylenoxy)benzene; 1,4-bis(mercaptoethylenoxy)benzene; 1,2-bis(mercaptomethylenethio)benzene; 1,3-bis(mercaptomethylenethio)benzene; 1,4-bis(mercaptomethylenethio)benzene; 1,2-bis(mercaptoethylenethio)benzene; 1,3-bis(mercaptoethylenethio)benzene; 1,4-bis(mercaptoethylenethio)benzene; 1,2,3-trimercaptobenzene; 1,2,4-trimercaptobenzene; 1,3,5-trimercaptobenzene; 1,2,3-tris(mercaptomethylene)benzene; 1,2,4-tris(mercaptomethylene)benzene; 1,3,5-tris(mercaptomethylene)benzene; 1,2,3-tris(mercaptoethylene)benzene; 1,2,4-tris(mercaptoethylene)benzene; 1,3,5-tris(mercaptoethylene)benzene; 1,2,3-tris(mercaptomethylenoxy)benzene; 1,2,4-tris(mercaptomethylenoxy)benzene; 1,3,5-tris(mercaptomethylenoxy)benzene; 1,2,3-tris(mercaptoethylenoxy)benzene; 1,2,4- tris(mercaptoethyleneoxy)benzene; 1,3,5-tris(mercaptoethylenoxy)benzene; 1,2,3-tris(mercaptomethylenethio)benzene; 1,2,4-tris(mercaptomethylenethio)benzene; 1,3,5-tris(mercaptomethylenethio)benzene; 1,2,3-tris(mercaptoethylenethio)benzene; 1,2,4-tris(mercaptoethylenethio)benzene; 1,3,5-tris(mercaptoethylenethio)benzene; 1,2,3,4-tetramercaptobenzene; 1,2,3,5-tetramercaptobenzene; 1,2,4,5-tetramercaptobenzene; 1,2,3,4-tetrakis(mercaptomethylene)benzene; 1,2,3,5-tetrakis(mercaptomethylene)benzene; 1,2,4,5-tetrakis(mercaptomethylene)benzene; 1,2,3,4-tetrakis(mercaptoethylene)benzene; 1,2,3,5-tetrakis(mercaptoethylene)benzene; 1,2,4,5-tetrakis(mercaptoethylene)benzene; 1,2,3,4-tetrakis(mercaptomethylenoxy)benzene; 1,2,3,5-tetrakis(mercaptomethylenoxy)benzene; 1,2,4,5-tetrakis(mercaptomethylenoxy)benzene; 1,2,3,4-tetrakis(mercaptoethylenoxy)benzene; 1,2,3,5-tetrakis(mercaptoethylenoxy)benzene; 1,2,4,5-tetrakis(mercaptoethylenoxy)benzene; 1,2,3,4-tetrakis(mercaptomethylenethio)benzene; 1,2,3,5-tetrakis(mercaptomethylenethio)benzene; 1,2,4,5-tetrakis(mercaptomethylenethio)benzene; 1,2,3,4-tetrakis(mercaptoethylenethio)benzene; 1,2,3,5-tetrakis(mercaptoethylenethio)benzene; 1,2,4,5-tetrakis(mercaptoethylenethio)benzene; and the respective nucleus-chlorinated, brominated, methylated and ethylated derivatives.

21. The lens of claim 12, wherein said polythiol of formula (III) is at least one member selected from the group consisting of 3-chloro-1,2-dimercaptobenzene, 4-chloro-1,2-dimercaptobenzene, 3,5-dichloro-1,2-dimercaptobenzene, 3,4,5-tribromo-1,2-dimercaptobenzene, 5-methyl-1,3-dimercaptobenzene, 5-ethyl-1,3-dimercaptobenzene, and 2,3,4,6-tetrachloro-1,5-bis(mercaptomethylene)benzene.

22. The les of claim 12, wherein said polyisocyanate component and said polythiol component are used in such an amount that the —NCO/—SH ratio falls within the range of from 0.5 to 1.5.

* * * * *